United States Patent [19]

Johnson

[11] 3,722,317
[45] Mar. 27, 1973

[54] APPARATUS FOR CONTROLLING MOVEMENT BETWEEN RELATIVELY RECIPROCABLE BODIES

[75] Inventor: Glenn H. Johnson, Houston, Tex.

[73] Assignee: Hudson Products Corporation, Houston, Tex.

[22] Filed: Aug. 2, 1971

[21] Appl. No.: 168,090

[52] U.S. Cl. .......................... 74/527, 74/242.14 R
[51] Int. Cl. ........................... G05g 5/04, G05g 5/06
[58] Field of Search...... 74/531, 586, 242.13, 242.14, 74/242.15 R, 527; 248/356, 161; 188/268

[56] References Cited

UNITED STATES PATENTS

| | | | |
|---|---|---|---|
| 3,419,112 | 12/1968 | Smith | 74/531 X |
| 709,010 | 9/1902 | Gonce | 188/67 |
| 2,984,212 | 5/1961 | Hicks et al. | 188/67 |

FOREIGN PATENTS OR APPLICATIONS

| | | | |
|---|---|---|---|
| 471,103 | 1/1951 | Canada | 248/161 |

Primary Examiner—Milton Kaufman
Assistant Examiner—Frank H. McKenzie
Attorney—W. F. Hyer et al.

[57] ABSTRACT

A pair of shafts having a flexible belt disposed about pulleys thereon are mounted for relative reciprocation, a fluid actuator is connected between shaft mountings to urge them apart and thereby maintain tension in the belt, and a means is provided for normally preventing movement of the shafts toward one another in the event the fluid supply to the actuator should fail.

15 Claims, 9 Drawing Figures

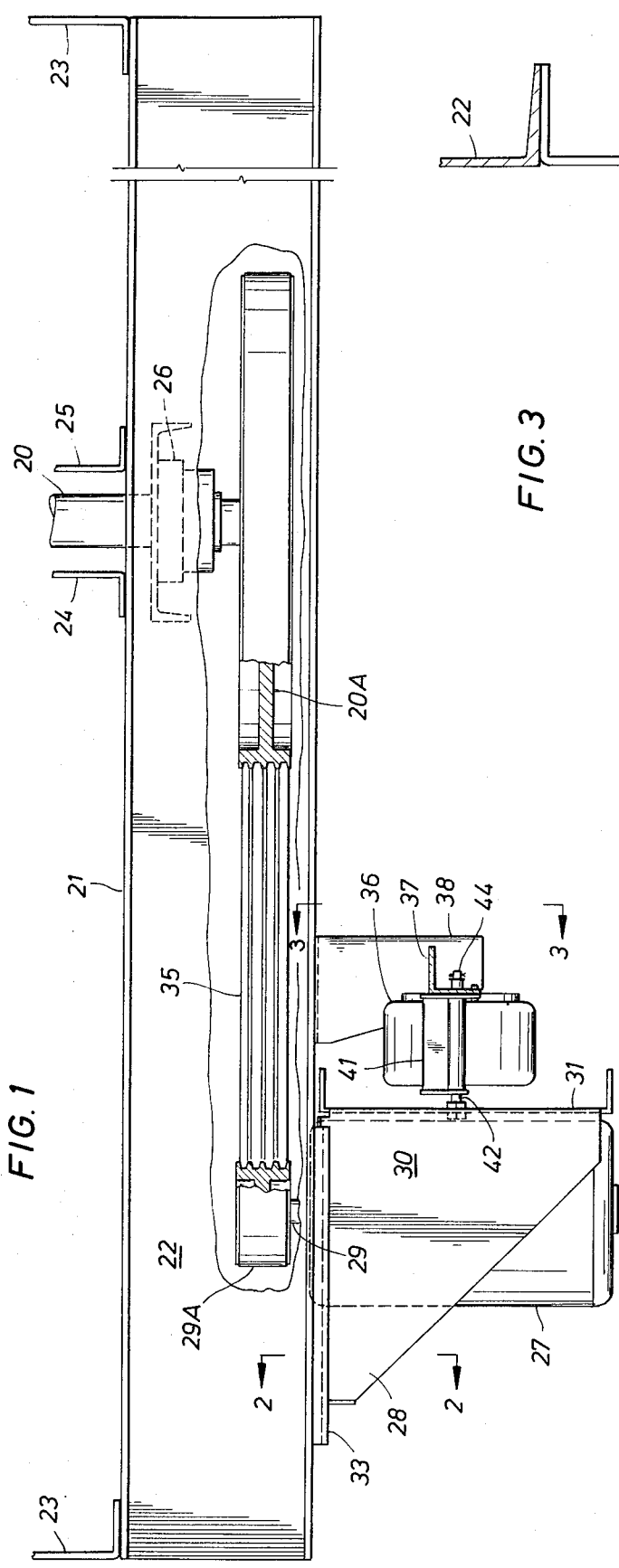
FIG. 1
FIG. 2
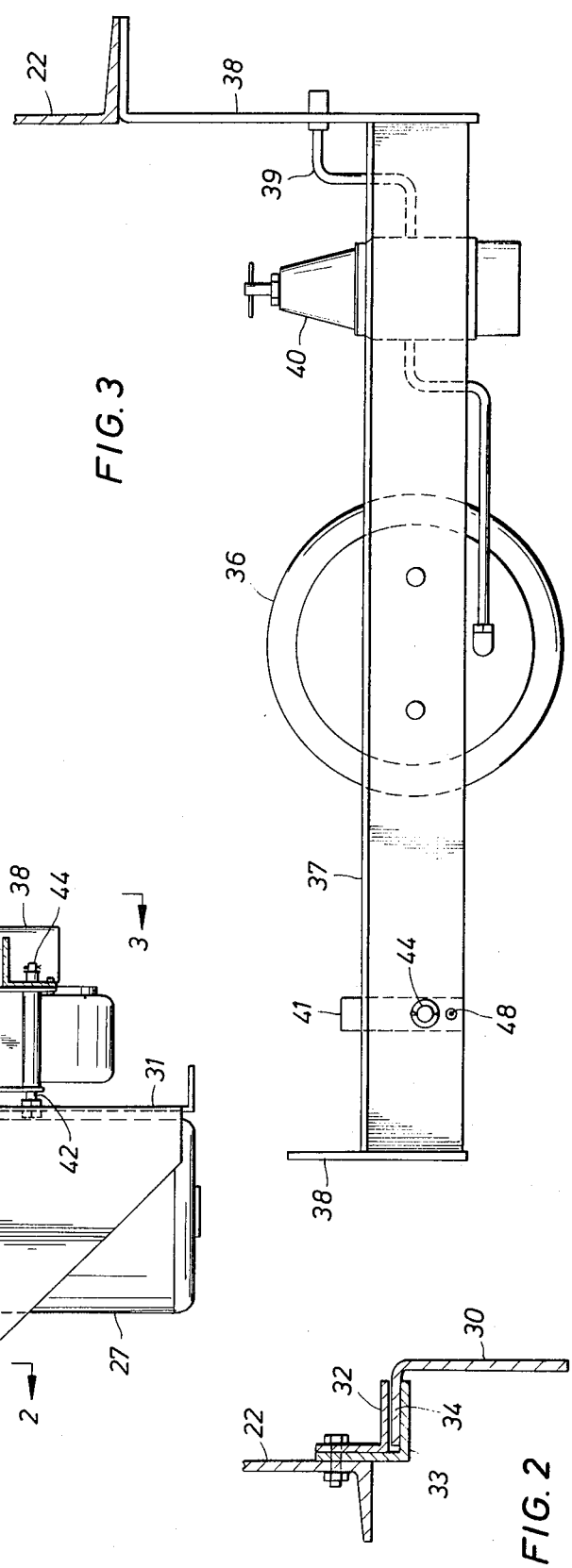
FIG. 3

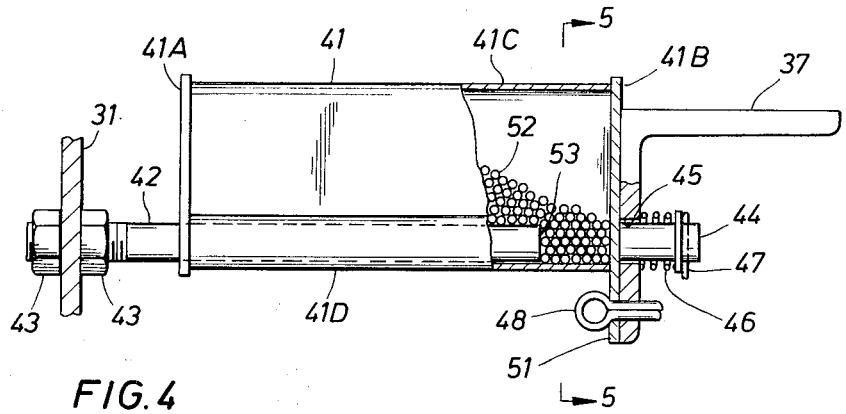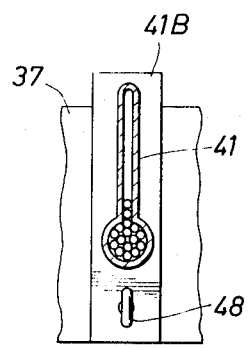
FIG.4
FIG.5
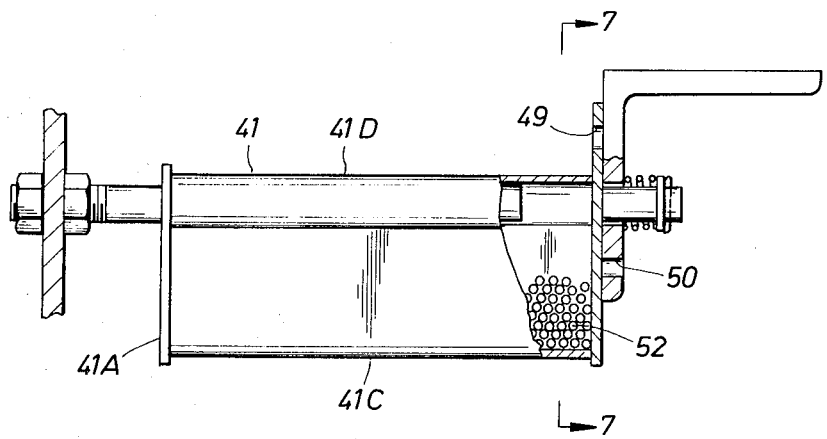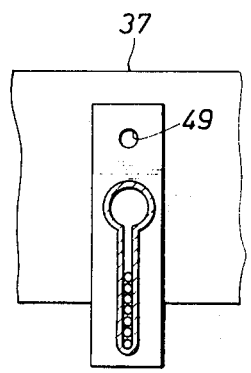
FIG.6
FIG.7
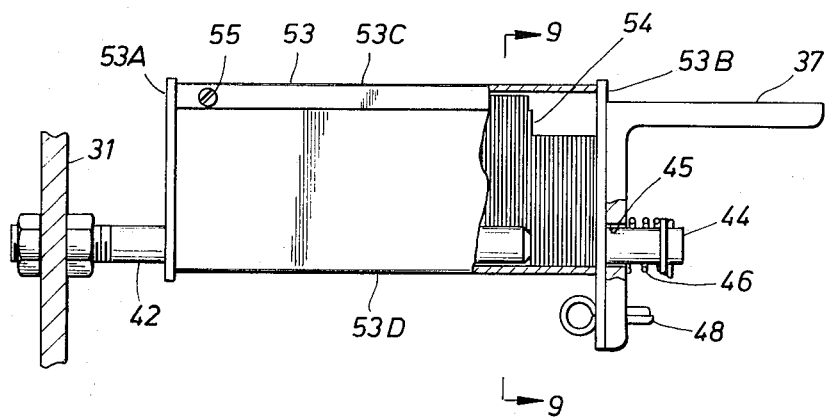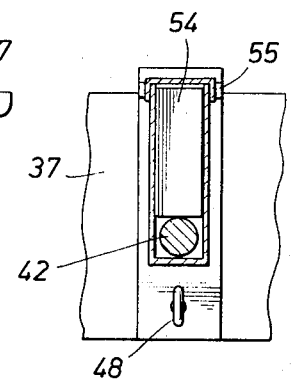
FIG.8
FIG.9

APPARATUS FOR CONTROLLING MOVEMENT BETWEEN RELATIVELY RECIPROCABLE BODIES

This invention relates to apparatus for controlling movement between relatively reciprocable bodies, such as driving and driven shafts about the pulleys of which a flexible belt is disposed and between which a fluid actuator is connected to urge the shafts apart and thereby automatically maintain desired tension in the belt. More particularly, this invention relates to an improvement in apparatus of this type which is "fail safe" in that the shafts or other relatively reciprocable bodies are normally prevented from moving toward one another, as might otherwise occur upon failure of the fluid supply to the actuator.

It has heretofore been proposed to maintain desired tension in flexible belt drives by means of idler pulleys arranged to be pushed either inwardly or outwardly against the belt intermediate shafts which are fixed against relative reciprocation. However, when the pulleys are arranged to push inwardly, they cause reverse flexing of the belt which results in increased wear, and when they are arranged to push outwardly, the idler pulleys decrease contact between the belt and pulleys on the shafts and thus increase the possibility of slippage.

It has also been proposed to mount the driving shaft for pivotal movement with respect to the driven shaft, so that the motor on the driving shaft may be swung into a position for imposing a desired load on the belt. However, mountings of this type are dependent on gravity and thus limit the position in which the belt can function. Hence, it has further been proposed to maintain desired tension in such belts by mounting the shafts for relative reciprocation and connecting a jack screw between their mountings for selectively urging them apart. However, these jack screws require frequent manual adjustment by a skilled operator.

In order to overcome these and other problems, it is preferred to urge relatively reciprocable shafts apart by means of an actuator responsive to fluid supplied thereto at a regulated pressure. This automatically maintains desired tension in the belt, and thus eliminates the need for frequent adjustment, as is required for jack screws. At the same time, such apparatus does not require orientation of the shaft mountings which is limited by gravity and does not increase wear upon or reduce contact with the belt, as in the case of idler pulleys. Nevertheless, it is possible for such apparatus to fail, and thus permit such belt tension to be relieved, in the event there is a loss of supply fluid to the actuator, and it is therefore an object of this invention to provide apparatus of this latter type which is "fail safe" in the event of the loss of supply fluid.

Another object is to provide fail safe apparatus for use in the above-described environment, or in other environments wherein there is need to similarly control the movement of relatively reciprocable bodies, and particularly wherein such bodies are normally urged apart by a fluid actuator, which fail safe apparatus functions independently of fluid or other power sources susceptible of failure.

A more particular object is to provide such apparatus which may be manipulated to permit such bodies to be moved toward one another, and thus to relieve the tension of a belt or other flexible member about them, with a minimum of time and effort.

A further object is to provide such apparatus which is of simple and inexpensive construction, which is easy to install and repair, and which requires a minimum of space.

These and other objects are accomplished, in accordance with the illustrated embodiment of the invention, by apparatus which includes a housing adapted to be supported by one of said bodies, and a part adapted to be connected to the other body and extending through one end of the housing for reciprocation with respect to it. The part is preferably a slender rod having a shoulder which faces the opposite end of the housing, and relatively small particles are contained within the housing for free sliding relatively to one another in a direction generally transverse to the path of reciprocation of the rod. When the housing is disposed in a first position with respect to the body on which it is supported, wherein the top side of the housing is on a level above the bottom side thereof, the particles are caused to wedge between the shoulder and the opposite end of the body, and thus prevent movement of the rod toward the opposite end of the housing. On the other hand, when the housing is disposed in a second position with respect to the body on which it is supported, wherein the top side is instead on a level beneath the bottom side, the small particles are caused to move from between the shoulder on the rod and the opposite end of the housing, and thus permit the rod to move toward the opposite end of the housing.

Consequently, with the housing disposed in its first position, the rod and thus the body to which it is connected is free to move only in a direction away from the one body on which the housing is supported, whereby the other body is not free to move in a direction toward the one body in the event of failure of the means by which it is urged away from the one body. On the other hand, the housing may be selectively moved to its second position to permit the rod and thus the other body to be moved toward the one body, for purposes to be described.

In one embodiment of the invention, the small particles are shot, while in another embodiment of the invention, the particles are thin strips or shims. In either case, the particles are free to fall by gravity into wedging or releasing position between the rod shoulder and the opposite end of the housing as the housing is moved between its first and second positions.

In the illustrated embodiments of the invention, an actuator is connected between the bodies and is responsive to fluid pressures supplied to it for urging the bodies apart. Thus, when the housing is in its first position, the small particles wedged between the end of the rod and opposite end of the housing render the apparatus "fail safe" in the event of the loss of supply pressure to the actuator. More particularly, the actuator is connected between relatively reciprocable mountings for driving and driven shafts about the pulleys of which a flexible belt is disposed. Thus, the actuator urges the shafts apart so as to maintain desired tension in the belt. However, when it is desired to relieve this tension, as may be desired in replacing the belt, the housing may be moved to its second position, in which position, as previously described, the small particles are removed from between the rod shoulder and the end of the housing.

In the illustrated and preferred embodiment of the invention, the housing is supported on the mounting for one of the shafts for swinging about a fixed axis between its first and second positions. More particularly, this pivotal axis is aligned with the axis of reciprocation of the rod, and both such axes are disposed near the bottom side of the housing in both the first and second positions of the housing. Thus, the housing is swung between generally oppositely disposed upright and inverted positions in which the top and bottom sides are one above the other.

In the drawings, wherein like reference characters are used throughout to designate like parts:

FIG. 1 is a side view of relatively reciprocable frames mounting driving and driven shafts, and broken away in part to show a belt disposed about pulleys on the shaft and having desired tension maintained therein by means of a fluid actuator including "fail safe" apparatus constructed in accordance with the present invention;

FIG. 2 is an enlarged cross-sectional view of a slidable connection between the relatively reciprocable mountings for the driven and driving shafts, as seen along broken line 2—2 of FIG. 1;

FIG. 3 is a front view of the mounting frames of FIG. 1, on an enlarged scale and as seen along broken lines 3—3 of FIG. 1;

FIG. 4 is an enlarged side view of the fail safe apparatus of FIG. 1, with the housing in an upright position and broken away in part to show the end of the rod and shot contained therein;

FIG. 5 is a vertical sectional view of the apparatus of FIG. 4, as seen along broken line 5—5 of FIG. 4;

FIG. 6 is a view of the apparatus of FIG. 4, but with the housing inverted;

FIG. 7 is a vertical sectional view of the apparatus, as seen along line 7—7 of FIG. 6;

FIG. 8 is a side view of the second-mentioned embodiment of the fail safe apparatus, also with the housing in its upright position and broken away in part to show the end of the rod and the shims contained therein; and FIG. 9 is a vertical sectional view of the apparatus of FIG. 8, as seen along broken line 9—9 of FIG. 8.

With reference now to the details of the above-described drawings, and particularly to FIG. 1, a driven shaft 20 is supported on an open main frame 21 having longitudinally extending and laterally spaced apart side channels 22 connected by transverse end channels 23. A bearing 26 is mounted on channels 24 and 25 extending between the tops of channels 22 to support the shaft 20 for rotation about a fixed vertical axis intermediate the upper and lower ends of the side channels. A motor 27 is mounted on an open auxiliary frame 28 suspended from the main frame 21 for reciprocation longitudinally with respect thereto, and a driving shaft 29 extends from the upper end of the motor 27 for rotation about a vertical axis, and thus about an axis parallel to the axis of rotation of the shaft 20, intermediate the side channels 22 of the main frame. The auxiliary frame 28 includes laterally spaced apart side walls 30 at opposite sides of the motor 27 and a vertical channel 31 providing a front wall extending laterally between the front edges of the walls 30, and the motor is connected to one or more of these walls in any suitable manner.

As best shown in FIG. 2, a pair of angles 32 and 33 are connected to the lower end of each side channel 22 of the main frame to provide a longitudinally extending track along each side of the frame. An outwardly extending flange 34 on the upper end of each side wall 30 of the auxiliary frame slides horizontally within the track so as to permit the auxiliary frame to reciprocate with respect to the main frame, as previously described.

As also shown in FIG. 1, a pulley 20A is connected to the lower end of the driven shaft 20, and a pulley 29A is connected to the upper end of the driving shaft 29. More particularly, the pulleys are on substantially the same horizontal level, and a flexible, continuous belt 35 is disposed about them for transmitting rotation therebetween. It will be understood, however, that the belt may instead be a flexible chain and that the pulleys may be sprockets.

From the foregoing description, it will be apparent that movement of the auxiliary frame 28, and thus the motor 27 and drive shaft 29, to the left will cause the belt to be tensioned. On the other hand, movement of the auxiliary frame, motor and drive shaft to the right will loosen tension of the belt, and if desired, permit removal and replacement of the belt about the pulleys. The drive shaft is urged to the left so as to maintain desired tension of the belt by means of a reciprocable actuator 36 connected between the main and auxiliary frames. The actuator is of any suitable construction comprising a body connectible to one such frame and a shaft shiftable within and extending from the actuator for connection to the other frame. The shaft is caused to reciprocate along a longitudinal axis and to the left in response to fluid pressure applied to the right side of a piston or diaphragm connected to it.

The body of the actuator is supported on the main frame 21 by means of a bracket comprising an angle 37 extending laterally between a pair of side walls 38 connected at their upper ends to the lower ends of side channels 22 of the main frame. As shown in FIG. 1, this bracket is forwardly of the auxiliary frame 28 so as to provide sufficient room for the actuator 36 to be mounted in the manner described. The shaft extendible from the actuator body is connected to the front wall 31 of the auxiliary frame so as to move the auxiliary frame to the left in response to the application of pressure fluid to the actuator.

Pressure fluid is supplied to the actuator body from any suitable source through a conduit 39 having one end connected to side wall 38 and the opposite end connected to the right side of the actuator body. A regulator 40 of any suitable construction is connected in the line 39 and supported by the bracket so as to supply such fluid pressure to the actuator at a desired pressure.

Of course, the pressure of the supply fluid may be purposely lowered so as to relieve tension in the belt in the event the belt is to be replaced, or in the event less belt tension is desired. However, without the fail safe apparatus of the present invention, an accidental loss of supply pressure, due to a break in the supply conduit or the like, would permit the actuator shaft as well as the driving shaft 29 for the motor 27, to move to the right and thus relieve pressure within the belt.

The embodiment of the fail safe apparatus shown in each of FIGS. 1 and 3, and in more detail in FIGS. 4 to 7, comprises a housing 41 having end walls 41A and 41B and top and bottom walls 41C and 41D and supported on the inner side of the angle 37 mounted on the main frame, and a rod 42 supported by the wall 31 of the auxiliary frame 28 and extending through the left end of the housing 41. As shown in FIGS. 1 and 3, the housing and rod may be so supported to the side of actuator 36 opposite the regulator 40, and as previously described, the rod 42 is reciprocable with the auxiliary frame 28 and thus with respect to the housing 41.

As best shown in FIGS. 4 and 6, the left end of the rod 42 is threaded and extends through and is releasably connected to the channel 41 by lock nuts 43. The rod is of such length that a substantial portion of it will remain within the housing at the extreme position of the rod to the left with respect to the housing — i.e., maximum tension in the belt.

The housing 41 is supported from the angle 37 by means of a pin 44 extending from the right end 41B of the housing and through an opening 45 in the side of the angle for pivoting with respect thereto about the axis of the pin. The right ed of the housing is normally held against the left side of the angle by means of a coil spring 46 disposed about the outer end of the pin 44 and compressed between the right side of the angle and a cotter pin 47 received through the outer end of the pin. The spring 46 is, of course, yieldable to permit the housing to be moved away from the angle 37, and thus facilitate its pivotal movement about the axis of pin 44 between the upright position of FIG. 4, in which top side 41C is above bottom side 41D, and the inverted position of FIG. 6, wherein the top side is beneath the bottom side.

As shown in FIGS. 4 to 7, the axis of reciprocation of the rod 42 is aligned with the pivotal axis of the pin 44, so that the opening in the left end 41A of the housing 41 through which the rod extends may fit relatively closely about the rod regardless of the position of the housing with respect thereto. More particularly, the rod extends into the housing near its bottom side 41D, so that when the housing is swung from its upright to its inverted position, its center of gravity of the housing is moved from a position above the rod to a position below the rod.

Consequently, the housing will normally remain in the inverted position, particularly under the influence of the particles contained therein, as will be described to follow. However, in order to maintain the housing in its upright position of FIG. 4, a pin 48 is removably insertable through aligned holes 49 and 50 in a depending flange 51 on the right end of the housing and a lower portion of the side of angle 37. In moving the housing from its upright to its inverted position, it's merely necessary to remove the pin 48, and preferably to force the housing to the left against the urging of spring 46. Obviously, a reversal of this procedure is all that is required in swinging the housing back to its upright position.

As previously described, shot 52 is contained within the housing 41 for wedging between a shoulder provided by its end 53 and the right end 41B of the housing 41 in the upright position (FIG. 4) of the housing. Thus, with the housing so disposed, the shot prevents movement of the rod 42 and thus the drive shaft 29 to the right in the event of failure of the pressure source supplied to actuator 36.

On the other hand, upon swinging of the housing to its inverted position of FIG. 6, the shot 52 will fall by gravity onto what was the top side 41C of the housing 41 and thus remove themselves from between the end of the rod and the right end of the housing. Consequently, in this latter position of the housing, the rod and thus the drive shaft are free to move to the right so as to purposely relieve tension on the belt, and thus permit the belt to be replaced or permit its tension to be lessened.

As shown in FIGS. 5 and 7, the portion of the housing intermediate its ends 41A and 41C is of keyhole configuration in cross section. More particularly, the keyhole is so arranged as to dispose the enlargement for receiving the rod closely therein and thus beneath the narrow slot in the upright position of the housing. As will be apparent from FIG. 4, this resists any tendency for shot which is disposed between the end of the rod 42 and the right end of the housing to be forced upwardly out of wedging position.

Obviously, there must be a sufficient volume of shot 52 to provide the desired wedging effect solely in response to gravity, but not so great in volume as to prevent the shot from removal from between the end of the rod and the housing in the inverted position of the housing. Also, of course, the shot should be of uniform size and sufficiently small to adjust to incremental movements of the rod 42 in the leftward direction.

The shot 52 may be added to and removed from the housing 41 through the hole (not shown) in its left end 41A for receiving the rod 52. With suitable shot contained within the housing 41, the apparatus may be assembled by moving the housing into position between the channel 31 and the angle 37 and then inserting the pin 44 through the opening 45. The spring is assembled on the pin 44, and the rod 42 is then passed from left to right through the channel 31 and the left end of the housing 41 to dispose its end in a position to the right of that shown in FIGS. 4 and 6, whereby the right lock nut 43 may be made up with the threaded end thereof as it is moved back through the channel 31. Then upon making up of the left lock nut 43, assembly is completed. Obviously, the apparatus may be disassembled for replacement or repair by a reversal of this procedure.

The embodiment of the apparatus illustrated in FIGS. 8 and 9 is identical to the above-described embodiment except for the construction of the housing 53 thereof and the small particles 54 contained therein. Thus, as shown in FIG. 9, the portion of the housing intermediate its ends 53A and 53B is rectangular in cross section, and the particles 54 are shims or thin plates which are arranged side-by-side and of rectangular configuration for fitting closely between the sides of the mid portion of the housing. More particularly, these shims extend substantially continuously from the left to the right end of the housing so that they are retained in upright position, whereby they are free to fall vertically due to gravity. Thus, certain of the shims will fall into wedging position between the shoulder provided by the end 53 of the rod 42 and the right end 53B of the housing when the housing is in the upright position of FIGS.

8 and 9. On the other hand, when the housing is inverted so as to dispose top side 53C beneath bottom side 53D, the shims will slide by gravity downwardly against what was the top side, so that all of them are removed from between the shoulder on the rod and the right end 53B of the housing.

The top side 53D of the housing is removably connected to opposite sides of the mid portion of the housing by fasteners 55 or the like. Thus, the top side may be removed to permit insertion or removal of the shims 54 and then reconnected for containing the shims as the housing is swung between its alternate positions.

The remaining portions of the apparatus, including the rod 42 and the pin 44, their respective means of support on the channel 31 and angle 37, and their arrangement relative to the housing are identical to the embodiment of FIGS. 1 to 7, as will be apparent from FIGS. 8 and 9 and the use of identical reference characters thereon.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for controlling movement between relatively reciprocable bodies, comprising a housing adapted to be supported by one said body and having a top side, a bottom side, and opposite ends, a part adapted to be connected to the other body and extending through one end of the housing for reciprocation with respect thereto, said part having a shoulder thereon for facing the opposite end of the housing, and relatively small particles contained within the housing for free sliding relatively to one another in a direction generally transverse to the path of reciprocation of the part, so that said particles are caused to wedge between the shoulder and opposite end of the housing, and thereby prevent movement of the part toward said opposite end, when the housing is disposed in a first position in which the top side thereof is on a level above the bottom side, and caused to move from between said shoulder and opposite end of the housing, and thereby permit said part to move toward said opposite end, when the housing is disposed in a second position in which the top side thereof is on a level below said lower side.

2. Apparatus of the character defined in claim 1, wherein particles are shot.

3. Apparatus of the character defined in claim 1, wherein particles are thin strips.

4. Apparatus of the character defined in claim 1, wherein said housing has means thereon by which it may be supported by said one body for swinging about an axis parallel to the axis of reciprocation of the part.

5. Apparatus of the character defined in claim 4, wherein said axes are aligned.

6. Apparatus of the character defined in claim 5, wherein the part extends into the housing adjacent the bottom side thereof, and the top and bottom sides are substantially one above the other in the first and second positions of the housing.

7. In combination with a pair of relatively reciprocable bodies, apparatus comprising a housing having opposite ends, means supporting the housing on one of said bodies, a part extending through one end of the housing, means connecting the part to the other body for reciprocation within the housing, said part having a shoulder thereon for facing the opposite end of the housing, and relatively small particles contained within the housing for free sliding relatively to one another in a direction generally transverse to the path of reciprocation of the part, said supporting means including means by which the housing may be moved relatively thereto between a first position in which said particles are caused to wedge between the shoulder and opposite end of the housing, and thereby prevent movement of the part toward said opposite end, and a second position in which said particles are caused to move from between said shoulder and opposite end of the housing, and thereby permit said part to move toward said opposite end.

8. Apparatus of the character defined in claim 7, wherein the means by which the housing may be moved comprises a pivotal connection between the supporting means and said housing and having an axis about which the housing is swung between its first and second positions.

9. Apparatus of the character defined in claim 8, wherein the axis of the pivotal connection is aligned with the axis of reciprocation of the part.

10. Apparatus of the character defined in claim 9, wherein the housing has a top side and a bottom side, the top side being generally above the bottom side in the first position of the housing and generally below the bottom side in the second position thereof, and said part is near the bottom side of the housing in both said positions.

11. Apparatus of the character defined in claim 10, including means for releasably holding said housing in its first position.

12. Apparatus of the character defined in claim 11, wherein said holding means comprises holes in adjacent portions of each of said housing and supporting means adapted to be aligned in the first position of the housing, and a pin removably disposable through said holes.

13. Apparatus of the character defined in claim 8, wherein the pivotal connection comprises a pin on the one end of the housing and an opening in the supporting means receiving the pin for pivoting therein.

14. Apparatus of the character defined in claim 13, wherein a spring is disposed about the pin to yieldably urge the one end of the housing against the supporting means to permit the one end of the housing to be moved away from the supporting means during swinging of the housing between first and second positions.

15. In combination with a pair of relatively reciprocable bodies, apparatus comprising an actuator connected between the bodies and responsive to fluid pressure supplied thereto for urging the bodies apart, a housing, means supporting the housing on one body, a part connected to the other body and extending through one end of the housing for reciprocation with respect thereto, said part having a shoulder thereon facing the opposite end of the housing, and relatively small particles contained within the housing for free sliding relatively to one another in a direction generally transverse to the path of reciprocation of the part, said supporting means including means by which the housing may be moved with respect to the base between positions in which said particles are caused to wedge between the shoulder and opposite end of the housing, so as to prevent movement of the part toward said opposite end, and in which said particles are caused to move from between said shoulder and opposite end of the housing, so as to permit said part to move toward said opposite end.

* * * * *